(12) United States Patent
Mayya et al.

(10) Patent No.: US 12,382,871 B2
(45) Date of Patent: Aug. 12, 2025

(54) CLEANING SYSTEM WITH CROP DIVIDER STROKER ARRAY

(71) Applicant: DEERE & COMPANY, Moline, IL (US)

(72) Inventors: Kiran Kumar Mayya, Pune (IN); Yogesh N. Chande, Bettendorf, IA (US); Kevin P. Hurley, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 590 days.

(21) Appl. No.: 17/822,167

(22) Filed: Aug. 25, 2022

(65) Prior Publication Data

US 2024/0065173 A1 Feb. 29, 2024

(51) Int. Cl.
*A01F 12/46* (2006.01)
*A01F 12/44* (2006.01)

(52) U.S. Cl.
CPC .............. *A01F 12/46* (2013.01); *A01F 12/44* (2013.01)

(58) Field of Classification Search
CPC .......... A01F 12/44; A01F 12/46; A01F 12/32; A01F 12/30
USPC ....................................................... 460/101
See application file for complete search history.

(56) References Cited

U.S. PATENT DOCUMENTS

| | | | | |
|---|---|---|---|---|
| 3,913,589 A | * | 10/1975 | Rouse ..................... | A01F 12/44 460/90 |
| 4,548,213 A | * | 10/1985 | Phillips .................... | A01F 12/44 209/397 |
| 5,338,257 A | * | 8/1994 | Underwood ......... | A01D 75/282 460/95 |
| 6,843,719 B1 | * | 1/2005 | Sacquitne ............ | A01D 75/282 460/9 |

(Continued)

FOREIGN PATENT DOCUMENTS

| BR | 102020018945 A2 | 3/2022 | |
|---|---|---|---|
| EP | 3753393 B1 * | 11/2022 | ............. A01F 12/44 |

(Continued)

OTHER PUBLICATIONS

John Deere BH84306 Sidehill Cleaning Shoe Modification Kit for 9560STS Combines (1 page), retrieved on Jul. 20, 2022 from the Internet <URL: https://www.ebay.com/itm/JOHN-DEERE-BH84306-SIDEHILL-CLEANING-SHOE-MODIFICATION-KIT-FITS-9560STS-COMBINES-/321836875465>.

(Continued)

*Primary Examiner* — Joseph M Rocca
*Assistant Examiner* — Sunny D Webb (57) ABSTRACT

A cleaning system for an agricultural combine harvester includes a pan and a crop divider. The pan includes a stepped floor to receive crop material thereon and is arranged for fore-aft reciprocating movement to advance the crop material in a crop-processing direction. The crop divider is mounted with the pan for fore-aft reciprocating movement therewith and extends in a fore-aft manner and above the (Continued)

stepped floor to partition the crop material laterally. The crop divider includes a body and a periphery disposed about the body. The body includes a multi-dimensional, clustered array of crop strokers extending laterally to engage the crop material to advance the crop material in the crop-processing direction during fore-aft reciprocating movement of the pan.

17 Claims, 12 Drawing Sheets

(56) References Cited

U.S. PATENT DOCUMENTS

| | | |
|---|---|---|
| 10,064,337 B2 | 9/2018 | Reinecke et al. |
| 2005/0164755 A1* | 7/2005 | Nelson ................. A01D 75/282 |
| | | 460/101 |
| 2013/0210505 A1* | 8/2013 | Bischoff ............... A01F 12/446 |
| | | 460/101 |

FOREIGN PATENT DOCUMENTS

| | | |
|---|---|---|
| WO | WO 2020/126211 A1 | 6/2020 |
| WO | WO 2022/090826 A1 | 5/2022 |

OTHER PUBLICATIONS

John Deere Combine Harvester Front Step Pan and Associated Crop Dividers (admitted prior art May 17, 2022).

* cited by examiner

CLEANING SYSTEM WITH CROP DIVIDER STROKER ARRAY

TECHNICAL FIELD

The present disclosure relates to a cleaning system for an agricultural combine harvester.

BACKGROUND

An agricultural combine harvester intakes crop gathered from a field and processes the crop to separate grain from material other than grain (MOG). Combine harvesters have cleaning systems to separate grain from smaller pieces of MOG. Cleaning systems sometimes have crop dividers to partition crop materially laterally into bays.

SUMMARY

According to an aspect of the present disclosure, there is disclosed a cleaning system for an agricultural combine harvester. The cleaning system includes a pan and a crop divider. The pan includes a stepped floor to receive crop material thereon and is arranged for fore-aft reciprocating movement to advance the crop material in a crop-processing direction. The crop divider is mounted with the pan for fore-aft reciprocating movement therewith and extends in a fore-aft manner and above the stepped floor to partition the crop material laterally. The crop divider includes a body and a periphery disposed about the body. The body includes a multi-dimensional, clustered array of crop strokers extending laterally to engage the crop material to advance the crop material in the crop-processing direction during fore-aft reciprocating movement of the pan.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
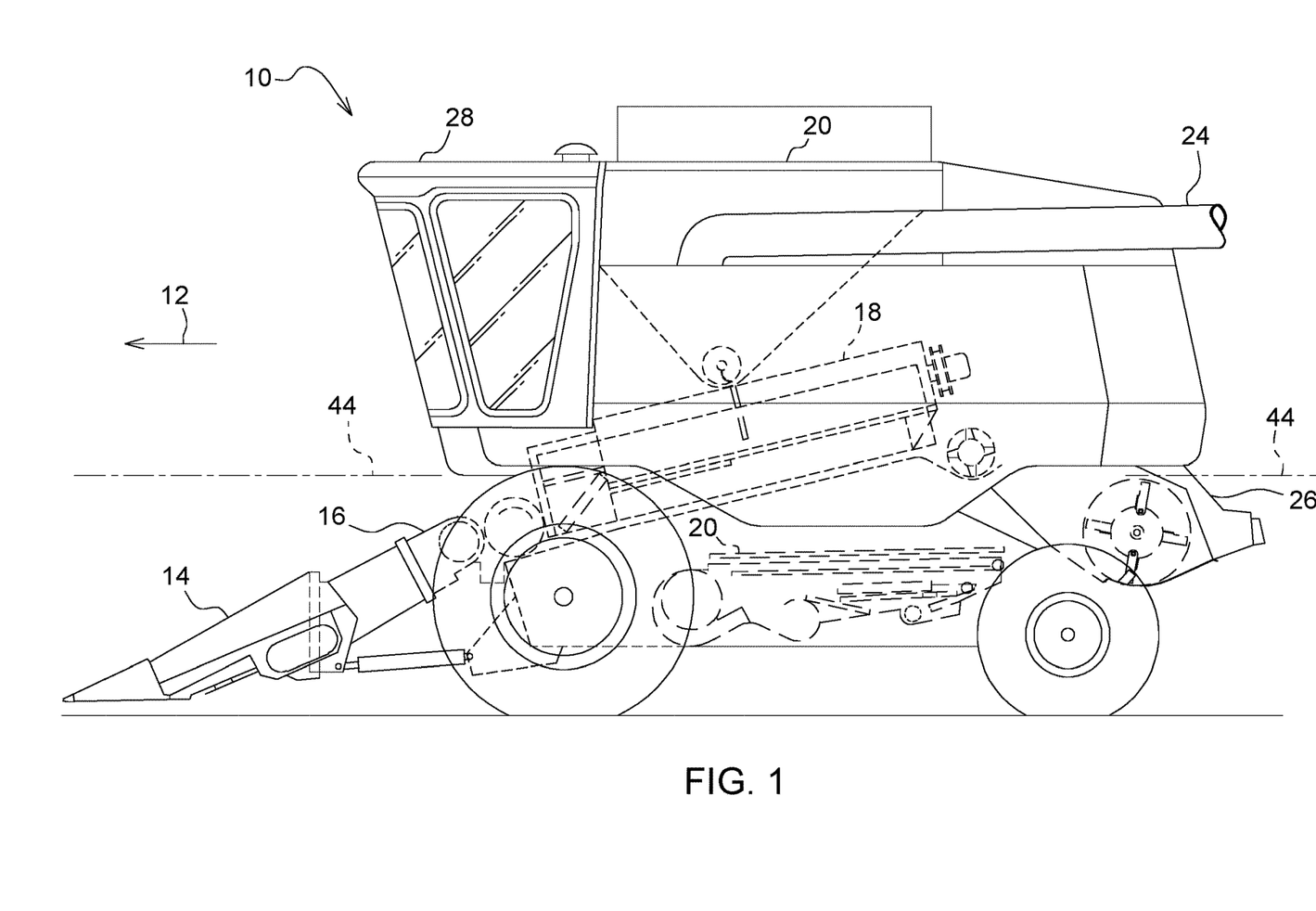
FIG. 1 a diagrammatic side elevational view, with portions broken away, showing an agricultural combine harvester with various functional systems including a cleaning system underlying a threshing and separating system.

Referring to FIG. 1, an agricultural combine harvester 10 is configured to move in a forward or harvest direction of travel 12 over a field to harvest crop material from the field. The harvester 10 processes the crop, separating grain from residual crop material known as material other than grain or MOG (e.g., straw, stalks, cobs, leaves, chaff).

In general, the harvester 10 may include front-end equipment 14 to cut, gather, and transport crop rearwardly (some front-end equipment 14 may not cut crop, as in the case of a belt pick-up unit), a feederhouse 16 to advance crop material received from the equipment 14 into the body of the harvester 10, a threshing and separating system 18 to thresh crop material and separate grain from material other than grain (MOG), a cleaning system 20 (also known as a "cleaning shoe") to separate grain from chaff and other MOG, a clean grain elevator (not shown) to elevate clean grain to a storage bin 22, an unloader 24 to unload clean grain from the storage bin 22 to another location, and a residue system 26 to process and distribute crop residue back onto the field. A person can control the harvester 10 from an operator's station 28 of the harvester 10. The harvester 10 may be configured in a wide variety of ways.

The threshing and separating system 18 includes an axial rotor and a concave assembly. The rotor and the concave assembly cooperate to provide the threshing and separating system with a front threshing zone for threshing grain and a rear separating zone for separating threshed grain from MOG. In some examples, the threshing and separating system 18 includes a second rotor (not shown) and a second concave assembly (not shown), which cooperate to provide the threshing and separating system 18 with a second front threshing zone and a second rear separating zone. In such a case, the rotors are similar to one another in structure and function, and the concave assemblies are similar to one another in structure and function. The threshing and separating system 18 may be configured in a wide variety of ways.

Figure 2:
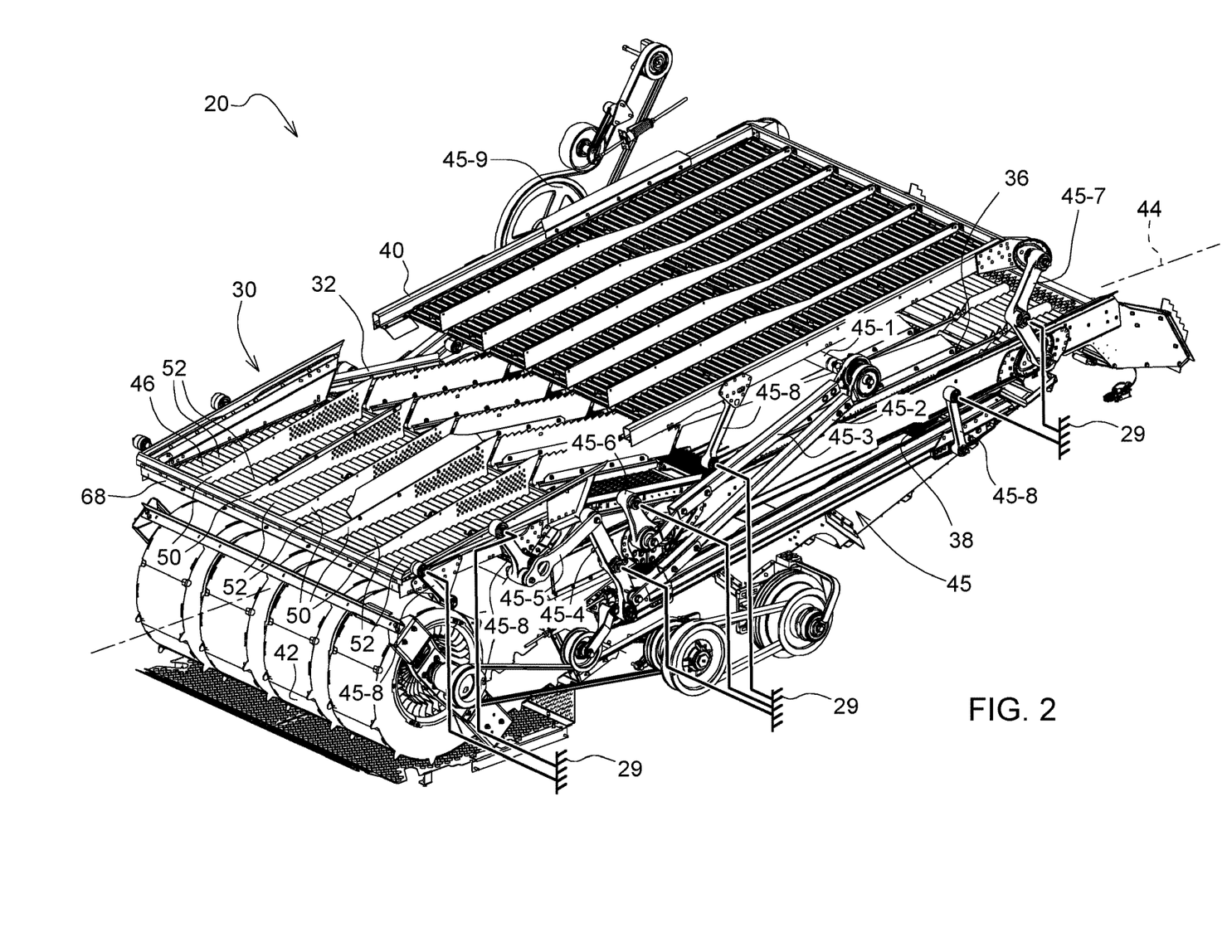
FIG. 2 is a perspective view showing the cleaning system, the cleaning system including a front step pan (on the left) and a number of crop dividers partitioning the front step pan into bays with crop material.

Referring to FIG. 2, the cleaning system 20 includes a front step pan 30 (which may also be referred to as a preparation pan), an inclined front chaffer 32 (which may also be referred to as a sieve), a lower step pan (not shown), a chaffer 36 (which may also be referred to as a sieve), a sieve 38, a return pan 40, and a fan assembly 42 (e.g., including four fans). The lower step pan is mounted with the chaffer 36 so as to be positioned in front of the chaffer 36 and below the front chaffer 32. The front step pan 30, the front chaffer 32, the lower step pan, the chaffer 36, the sieve 38, and the return pan 40 are arranged for fore-aft reciprocating movement in a fore-aft dimension 44 of the combine harvester 10 to process and advance crop material.

A drive mechanism 45 imparts the fore-aft reciprocating movement. The drive mechanism 45 includes a rotary drive 45-1 and a linkage including a first drive link 45-2, a second drive link 45-3, a front rocker link 45-4, a pan link 45-5, a chaffer link 45-6, a rear rocker link 45-7, and a number of support links 45-8. The linkage is positioned on the left side of the combine harvester 10. The rotary drive 45-1 is rotated by a belt-driven pulley 45-9 positioned on the right side of the combine harvester 10. The first and second drive links 45-2, 45-3 are coupled eccentrically to the rotary drive 45-1 such that rotation of the rotary drive 45-1 imparts a reciprocating motion to the first and second drive links 45-2, 45-3. The first drive link 45-2 is coupled to the front rocker link 45-4 which is coupled at a first end to the sieve 38 to reciprocate the sieve 38 and at an opposite second end to the pan link 45-5 that reciprocates the front step pan 30 and the front chaffer 32. As such, the sieve 38 reciprocates in a manner opposite to the pan 30 and the front chaffer 32. The second drive link 45-3 is coupled to the chaffer link 45-6 which is coupled to the chaffer 36 to reciprocate the chaffer 36. The rear rocker link 45-7 is coupled at a first end to the chaffer 36 and at an opposite second end to the return pan 40 to reciprocate the return pan 40 in a manner opposite to the chaffer 36 in response to reciprocation of the chaffer 36. The support links 45-8 support the front step pan 30, the front chaffer 32, the lower step pan, the chaffer 36, the sieve 38, and the return pan 40 on the support structure 29 of the combine harvester 10. A similar linkage is positioned on the right side of the combine harvester.

The front step pan 30, the front chaffer 32, the lower step pan, and the chaffer 36 reciprocate in phase as a first unit. The sieve 38 and the return pan 40 reciprocate in phase as a second unit. The first and second units reciprocate 180 degrees out of phase with one another. The fore-aft reciprocating movement of the first and second units is relative to the support structure 29. It is to be appreciated that the front step pan 30, the front chaffer 32, the lower step pan, the chaffer 36, the sieve 38, and the return pan 40 may be driven for reciprocating movement in any suitable manner.

The front step pan 30 is positioned under a front portion of the threshing and separating system 18 to receive crop material on a stepped floor 46 of the pan 30. The pan 30 is configured for fore-aft reciprocating movement in the fore-aft dimension 44 to advance crop material in a crop-processing direction 46 toward the front chaffer 32. The crop-processing direction 46 is rearward with respect to the front step pan 30.

The return pan 40 is positioned under a rear portion the threshing and separating system 18 to receive crop material on a stepped floor of the return pan 40. Tailings may also be routed back to the return pan 40 for further processing by the cleaning system 20.

The pan 30 is configured for fore-aft reciprocating movement in the fore-aft dimension 44 to advance crop mat in a crop-processing direction toward the front chaffer 32. The crop-processing direction is forward with respect to the return pan 40.

Crop material may pass rearwardly from the front chaffer 32 to the chaffer 36. Grain and MOG may pass through the front chaffer 32 to the lower pan 34 and the chaffer 36. Grain and smaller pieces of MOG received from the front chaffer 32 and lower pan 34 may pass through the chaffer 32 to the sieve 38, which further filters for grain. The fan assembly 42 blows air rearwardly through and across the chaffers 32, 36 and sieve 38 to advance MOG to the residue system 26 for discharge from the combine harvester 10.

Figure 3:
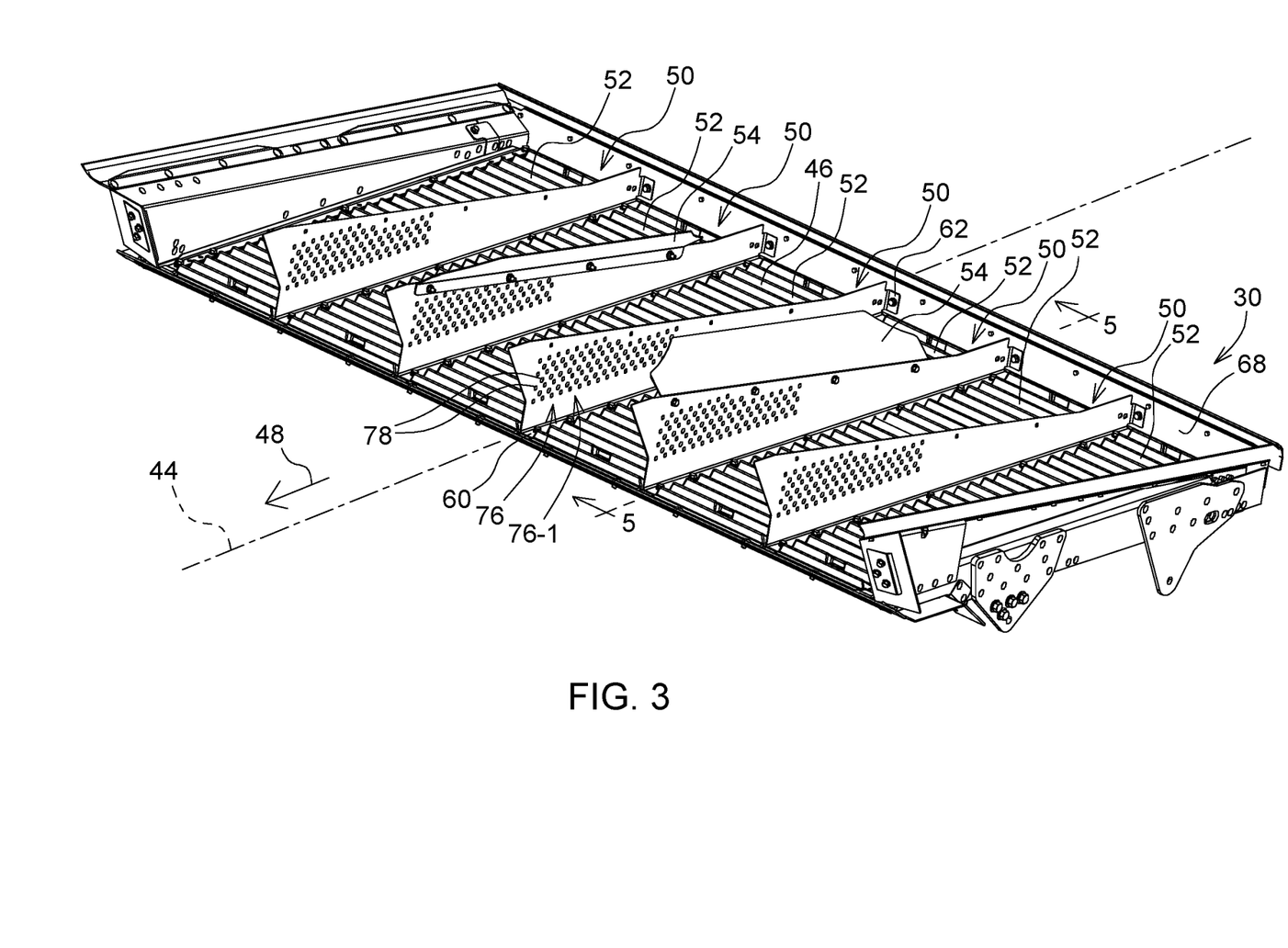
FIG. 3 is an enlarged perspective view showing the front step pan and the crop dividers mounted with the front step pan.
Figure 4:
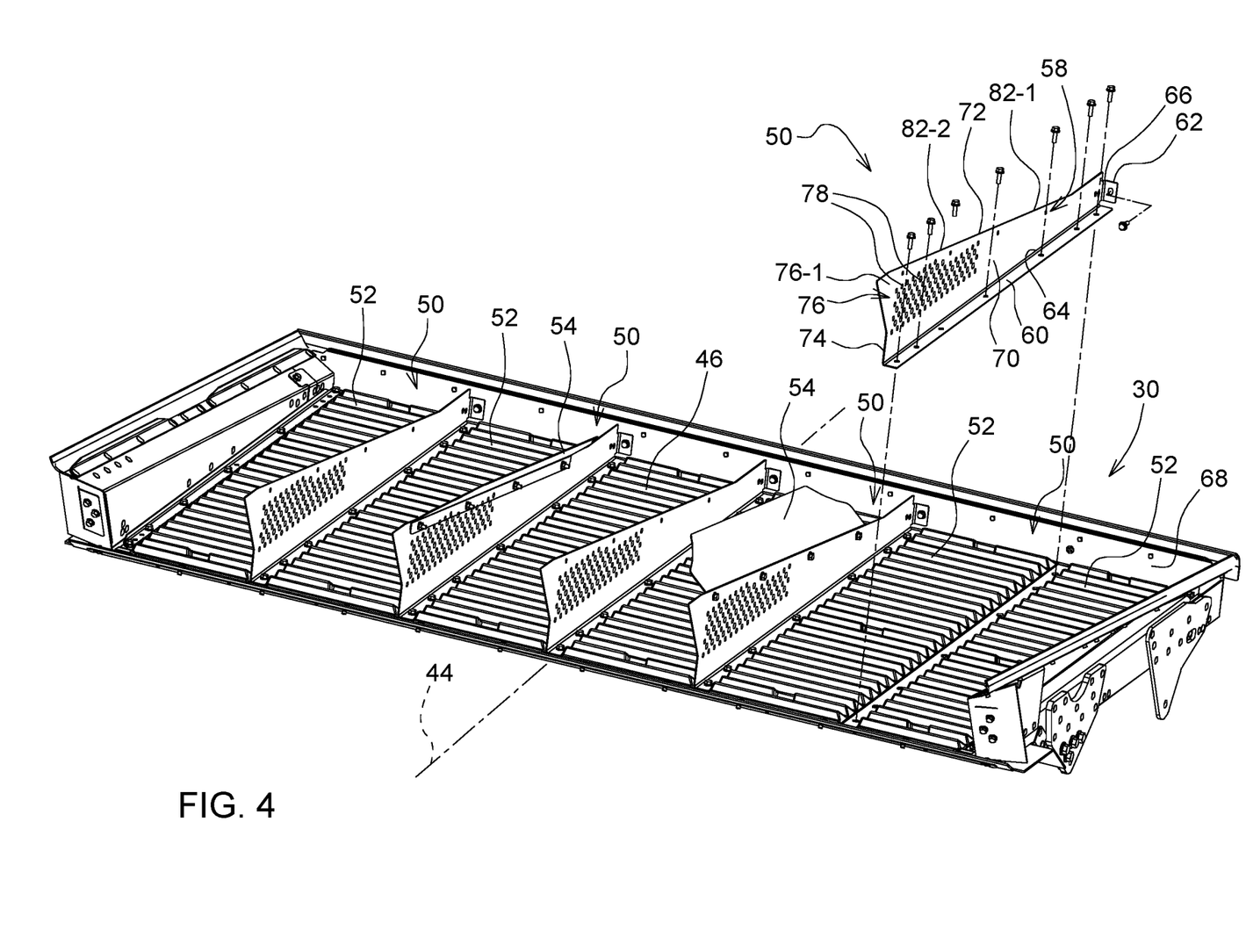
FIG. 4 is an exploded perspective view showing the front step pan and crop dividers.
Figure 5:
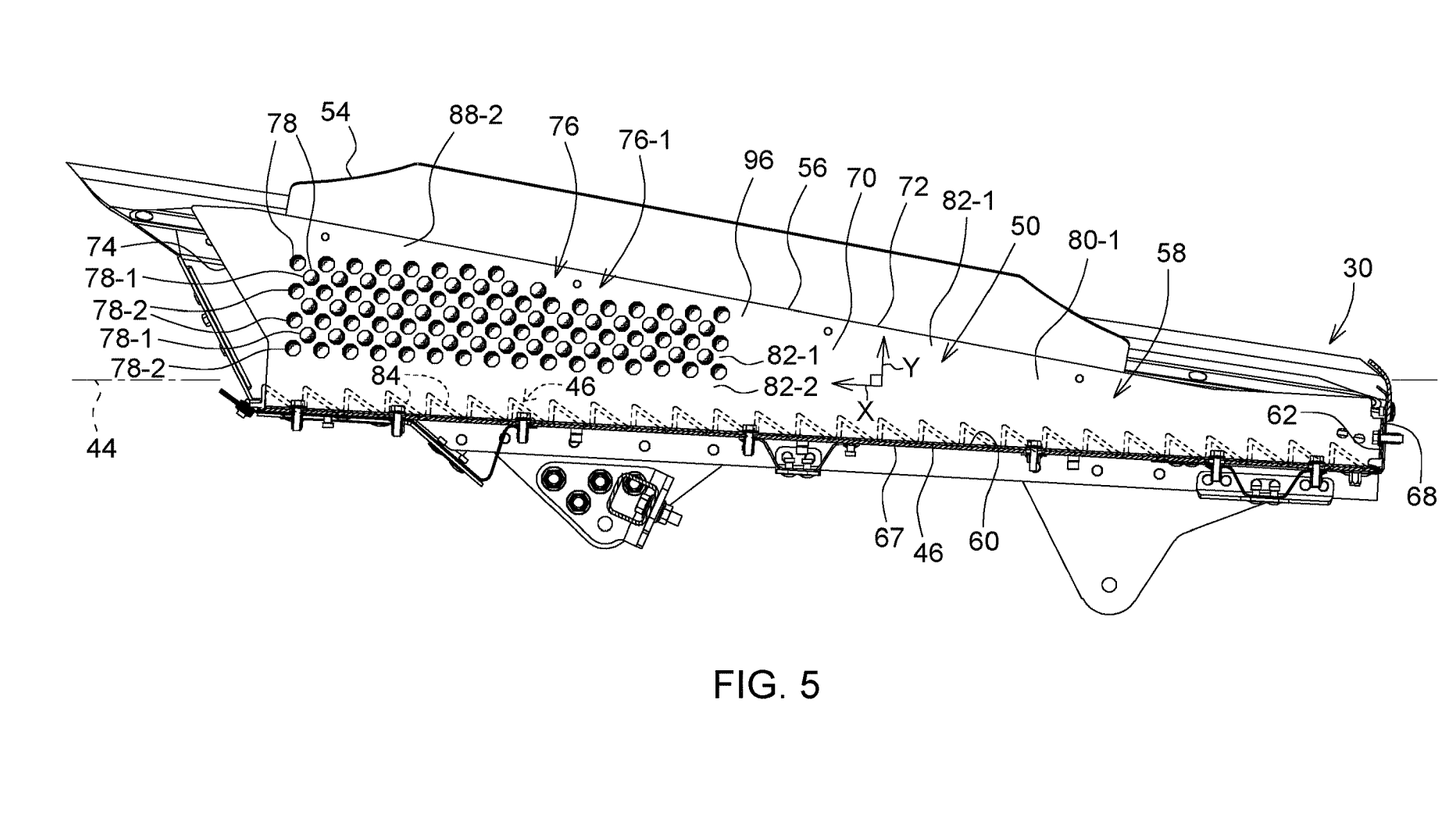
FIG. 5 is a sectional view taken along lines 5-5 of FIG. 3.

Referring to FIGS. 3-5, the cleaning system 20 includes one or more crop dividers 50. For example, there are five crop dividers 50. It is to be appreciated that there could be any suitable number of crop dividers 50.

Figure 3A:
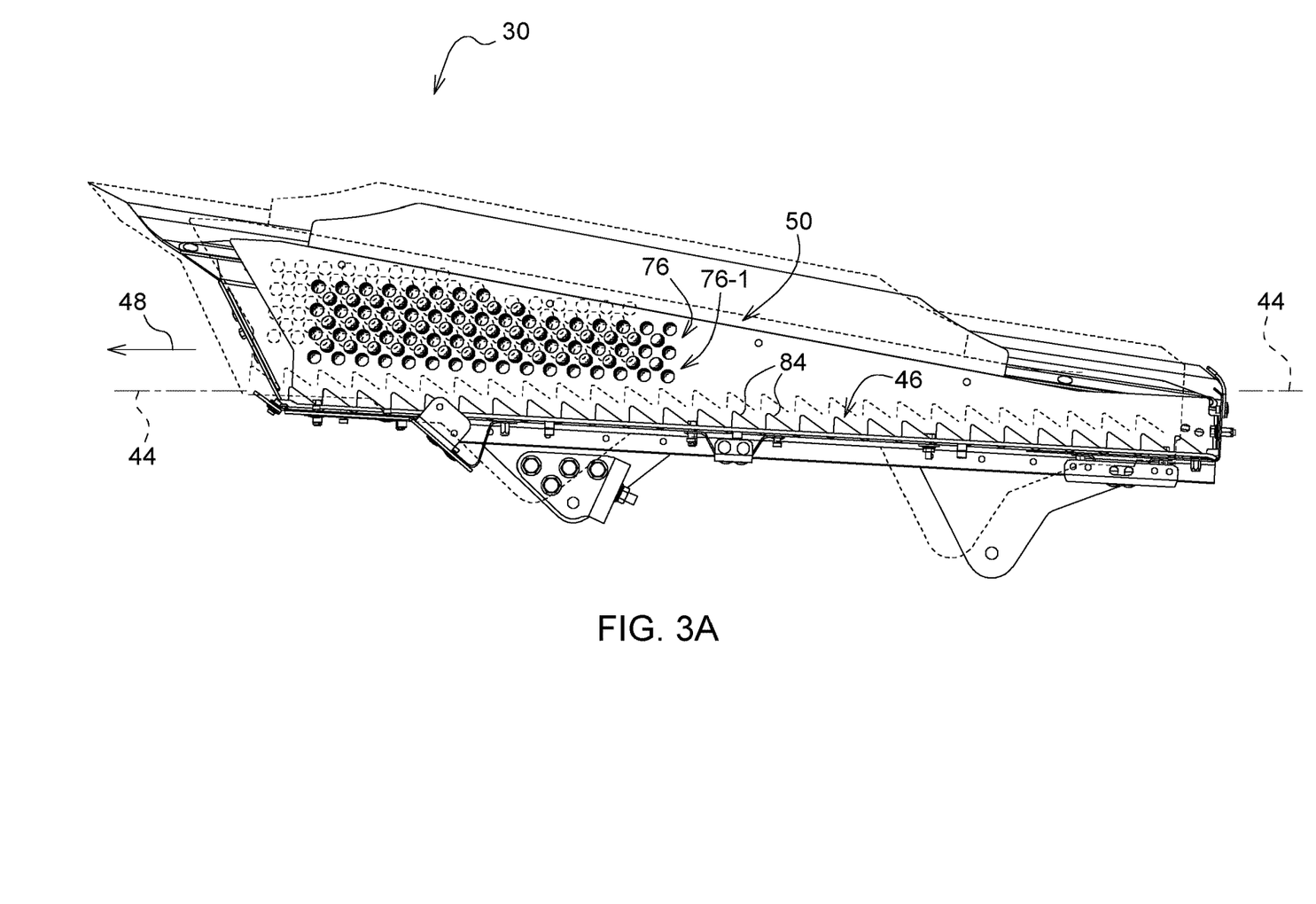
FIG. 3A is a side elevational view showing the front step pan and the crop dividers in a forwardmost position (in solid) and a rearwardmost position (in phantom)

The crop dividers 50 are mounted with the pan 30 for fore-aft reciprocating movement therewith. In such a case, the pan 30 and the crop dividers 50 mounted therewith have a forwardmost position and a rearwardmost position, which is rearward and may be somewhat upward from the forwardmost position (FIG. 3A). The crop dividers 50 partition the pan 30 into crop-receiving bays 52 (e.g., six bays).

Each crop divider 50 extends in a fore-aft manner in the fore-aft dimension 44 and above the stepped floor 46 of the pan 30 to partition the crop material laterally to inhibit lateral movement of crop material to one lateral side of the pan 30 or the other to foster lateral distribution of crop material in the cleaning system for cleaning effectiveness. The crop divider 50 partitions the pan 30 into laterally adjacent bays 52. A divider extension 54 may be mounted (e.g., bolted) to the crop divider 50 along a top edge 56 of the crop divider 50, as shown, for example, with respect to two crop dividers 50.

The crop divider 50 includes a panel 58, an attachment flange 60, and an attachment tab 62. The attachment flange 60 is coupled to and extends along a bottom edge 64 of the panel 58. The attachment flange 60 is coupled to the floor 46 and an underlying sub-structure 67 of the pan 30 with fasteners. Such fasteners may include, for example, hex flange bolts (e.g., six hex flange bolts) threaded to corresponding rivet nuts (e.g., six rivet nuts) and a hex flange bolt (e.g., third hex flange bolt from front of pan 30) received by a washer and threaded to a nut. The attachment tab 62 is coupled to a front edge 66 of the panel 58. The attachment tab 62 is coupled to a front wall 68 of the pan 30 with a fastener. Such fastener may include, for example, a hex flange bolt threaded to corresponding rivet nut. For ease of illustration, threads are not shown, and the rivet nuts are shown in their uncompressed state. The presence of threads and rivet nut compression for locking in place are to be understood. The crop divider 50 is configured, for example, as a formed piece of sheet metal (e.g., stamped sheet metal), although it may be configured in a wide variety of ways.

Referring to FIGS. 5-9, the panel 58 includes a body 70 and a periphery 72 disposed about the body 70. The periphery 72 includes the top edge 56, the bottom edge 64, the front edge 66, and a rear edge 74. The edges 56, 64, 66, 74 cooperate to provide the periphery 72.

The body 70 includes a multi-dimensional, clustered array 76 of crop strokers 78 extending laterally to engage crop material to advance the crop material in the crop-processing direction 48 (e.g., rearward) during fore-aft reciprocating movement of the pan 30. The array 76 includes a first array 76-1 of crop strokers on a first lateral side 80-1 of the body 70 and a second array 76-2 of crop strokers on an opposite second lateral side 80-2 of the body 70.

Figure 7:
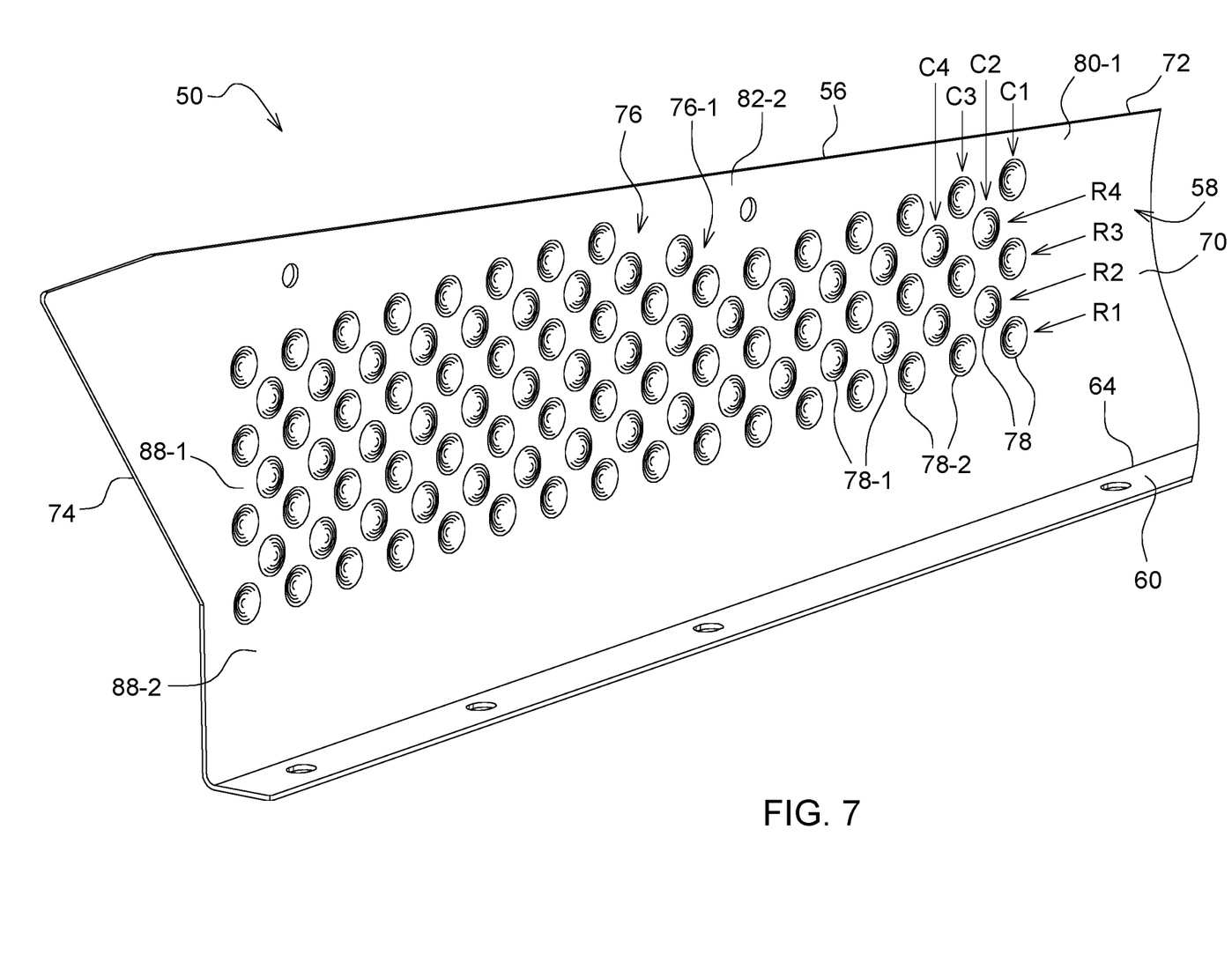
FIG. 7 is a perspective view, with portions broken away, showing a lateral side of the crop divider.
Figure 8:
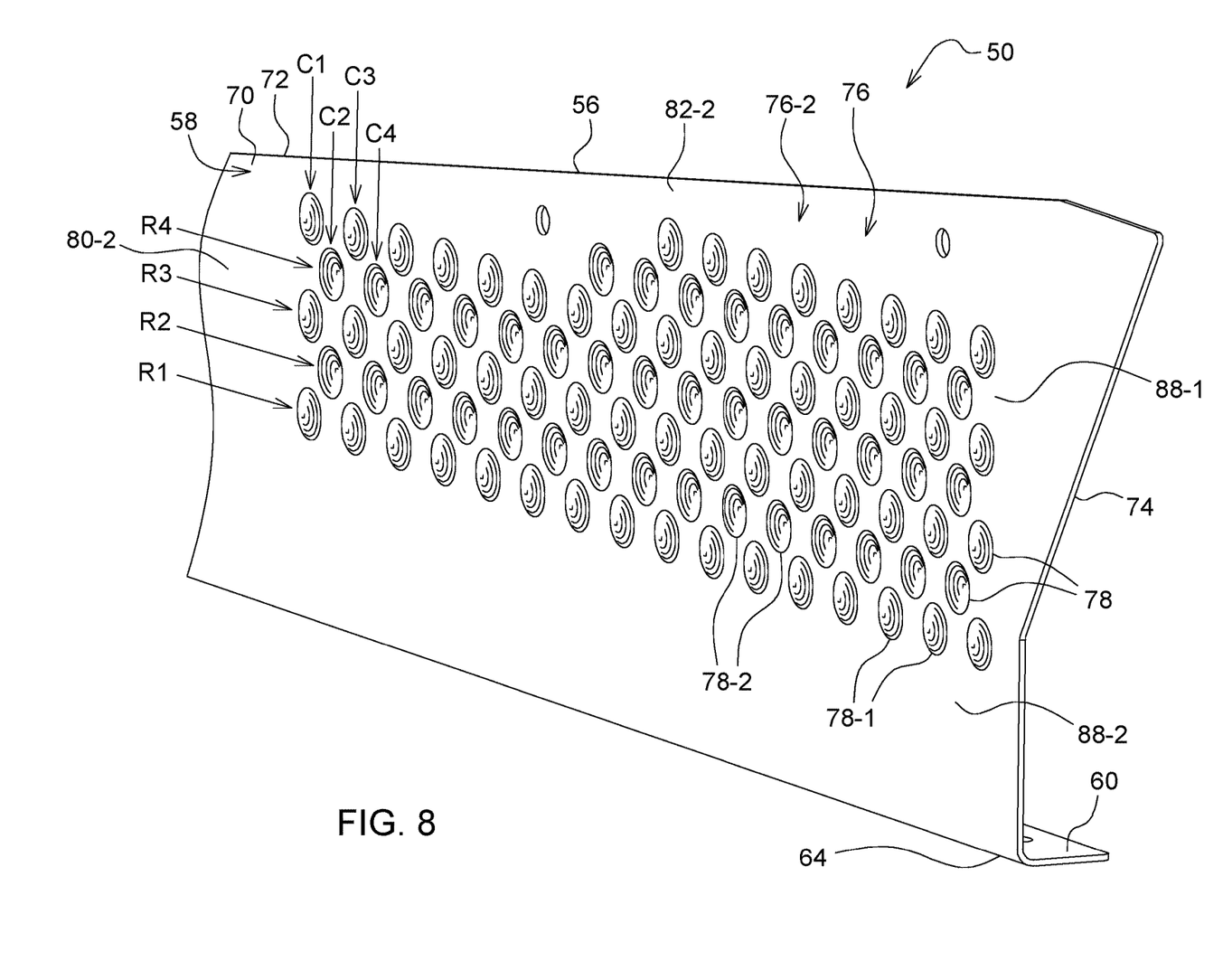
FIG. 8 is a perspective view, with portions broken away, showing an opposite lateral side of the crop divider.
Figure 9:
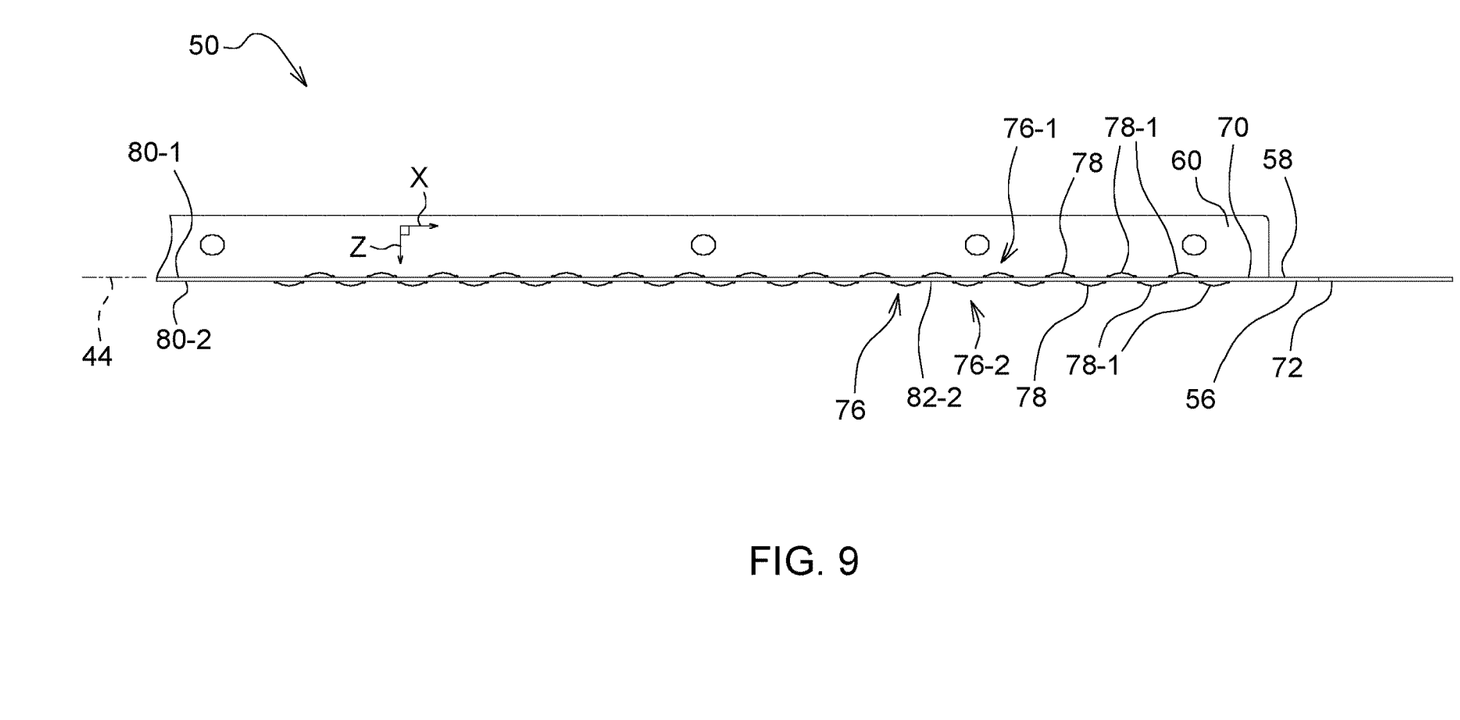
FIG. 9 is a top plan view of the crop divider showing crop strokers projecting laterally from either lateral side of the crop divider.

Each array 76-1, 76-2 is itself a multi-dimensional, clustered array of crop strokers. The first array 76-1 is positioned on the first lateral side 80-1 and extends laterally to engage crop material in a first bay 52 of the bays 52 to advance the crop material present in that bay 52 in the crop-processing direction 48 during fore-aft reciprocating movement of the pan 30. The second array 76-2 is positioned on the second lateral side 80-2 and extends laterally to engage crop material in a second bay 52 of the bays 52 to advance the crop material present in that bay 52 in the crop-processing direction 48 during fore-aft reciprocating movement of the pan 30.

Figure 6:
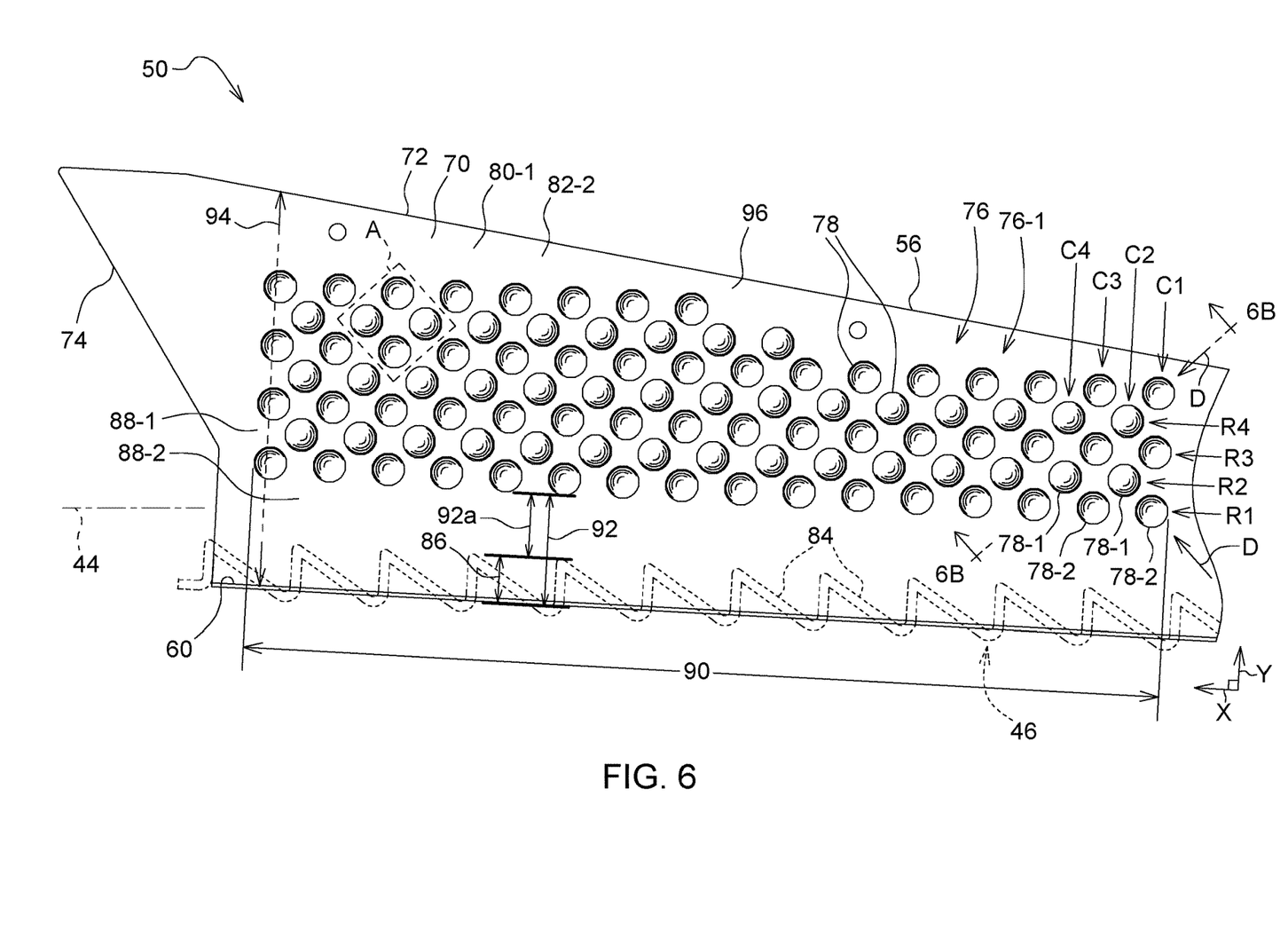
FIG. 6, is an enlarged side elevational view, with portions broken away, showing a crop divider with an array of crop strokers configured as bumps.

The crop strokers 78 of the array 76 are clustered together to promote the crop-advancing effectiveness of the array 76. The crop divider 50 includes an upstream half 82-1 and a downstream half 82-2 downstream of the upstream half 82-1 in the crop-processing direction 48. The crop strokers 78 are clustered, for example, in the downstream half 82-1.

The crop divider 50 has an X dimension, a Y dimension, and a Z dimension. The X dimension is parallel to the floor 46 in the direction of the length of the crop divider 50. The Y dimension is orthogonal to the floor 46 in an upward direction. The Z dimension is orthogonal to the X and Y dimensions in a direction of the thickness of the crop divider 50. The floor 46 has steps 84 with a step height 8 in the Y dimension.

The body 70 of the crop divider 50 includes an upper zone 88-1 and a lower zone 88-2. The upper zone 88-1 is textured with the array 76 of crop strokers 78 and is defined by the extent of the array 76. The lower zone 88-2 is positioned between the upper zone 88-1, more particularly the array 76, and the stepped floor 46, and is devoid of the array 76. The upper zone 88-1 is rougher than the lower zone 88-2 to promote engagement between the crop divider 50 and the crop material to advance the crop material during the crop-advancement stroke (rearward stroke) of the pan 30, which stroke is generally rearward and upward. The lower zone 88-2 presents less friction than the upper zone 88-1 so as to reduce engagement between the crop divider 50 and the crop material during the return stroke (forward stroke) of the pan 30, which stroke is generally forward and downward. The lower zone 88-2 is defined in the X dimension by a length 90 of the array 76 and in the Y dimension by a distance 92 between the attachment flange 60 and the array 76. The distance 92 is at least two times the step height 86. A portion of the distance 92 is a distance 92a defined in the Y dimension between the steps 84 of the stepped floor 46 and the array 76. The distance 92a is greater than or equal to the value of the step height 86.

The array 76 increases in height 94 in the Y dimension from the stepped floor 46 as the array 76 extends in the crop-processing direction 48, to further promote engagement between the crop divider 50 and the crop material to advance crop material during the crop-advancement stroke of the pan 30. The crop divider 50 includes an expansion zone 96 in which the top edge 56 increases in height 94 in the Y dimension from the stepped floor 46 as the crop divider 50 extends in the crop-processing direction 48. The expansion zone 94 includes at least most of the array 76.

Figure 6A:
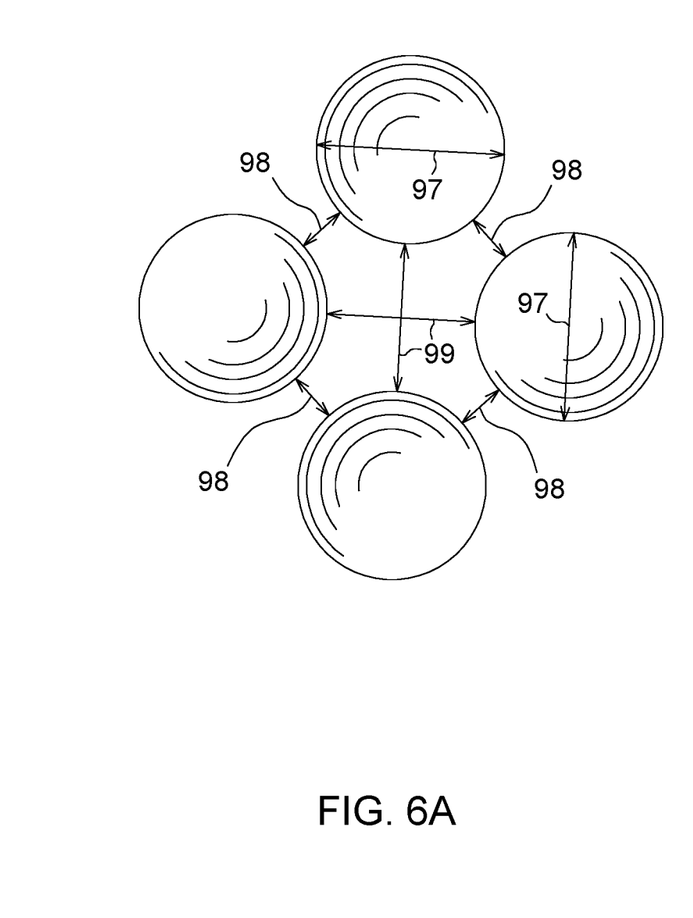
FIG. 6A is an enlarged side elevational view of region A of FIG. 6.

The array 76 is arranged multi-dimensionally. For example, the crop strokers 78 are arranged relative to one another in at least two orthogonal reference dimensions, e.g., dimensions X and Y. The array 76 includes rows (R1, R2, . . . Rn) of crop strokers 78 and columns (C1, C2, . . . Cn) of crop strokers 78. The rows may be arranged in the X dimension, and the columns may be arranged in the Y dimension. The crop strokers 78 of each row are positioned at regular intervals (e.g., equal intervals), and the crop strokers 78 of each column are positioned at regular intervals (e.g., equal intervals).

The crop strokers 78 are clustered in proximity to one another to maximize the rough surface area. Immediately adjacent rows of crop strokers 78 are alternatingly staggered relative to one another, and immediately adjacent columns of crop strokers 78 are alternatingly staggered relative to one another. Such staggering accommodates more crop strokers 78 in a given surface area, thereby maximizing the rough surface area. In other embodiments, immediately adjacent rows may not be staggered, and immediately adjacent columns may not be staggered.

Each crop stroker 78 has a maximum size 97. In the illustrated embodiment, the crop stroker 78 is round, in which case the maximum size 97 is the diameter of the crop stroker 78. Immediately adjacent crop strokers 78 are spaced apart from one another by an offset that is less than the maximum size 97. For example, immediately adjacent crop strokers 78 of each diagonal D of crop strokers 78 are spaced apart from one another by a first offset 98 that is less than the maximum size 97. Immediately adjacent crop strokers 78 of each row are spaced apart from one another by a second offset 99, and immediately adjacent crop strokers 78 of each column are spaced apart from one another by the second offset 99. The second offset 99 is less than the maximum size 97, although the second offset 99 may be larger than the first offset 98 due to the staggering of rows and columns. It is to be appreciated that the crop strokers 78 may be non-round.

Figure 6B:
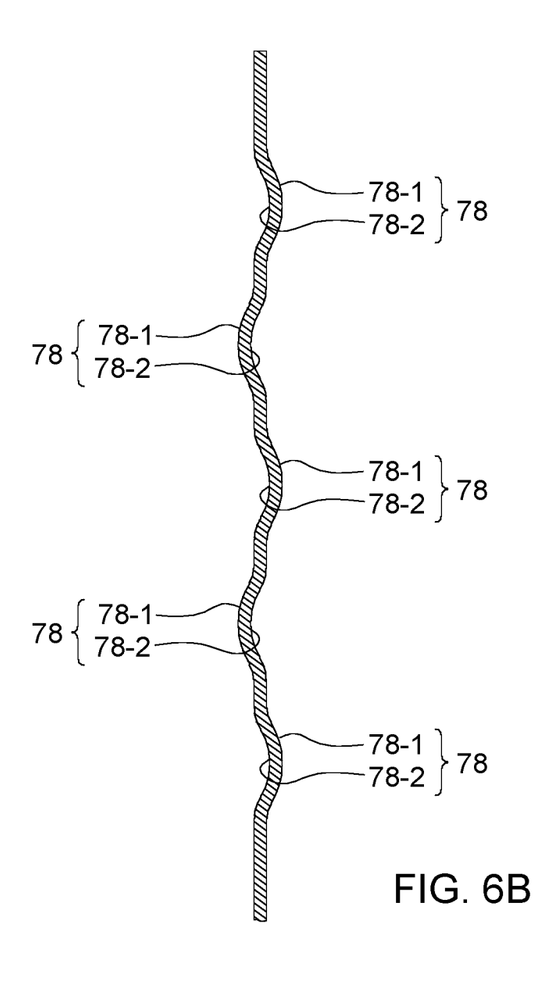
FIG. 6B is a sectional view taken along lines 6B-6B of FIG. 6.

Each crop stroker 78 may include a crop stroker 78-1 and a crop stroker 78-2. In such a case, the crop stroker 78-1 is positioned on one of the lateral sides 80-1, 80-2, and the crop stroker 78-2 is positioned on the other of the lateral sides 80-1, 80-2.

The crop stroker 78-1 is a first type of crop stroker, and the crop stroker 78-2 is a second type of crop stroker. The first type of crop stroker 78-1 and the second type of crop stroker 78-2 are different from one another. For example, the first type of crop stroker 78-1 and the second type of crop stroker 78-2 may be oppositely sensed. The first and second types may be inversely related to one another such that the crop stroker 78-1 and the crop stroker 78-2 are configured in a laterally inverse relationship to one another.

The first type of crop stroker 78-1 may be a lateral peak, and the second type of crop stroker 78-2 may be a lateral valley. Each lateral peak may be configured, for example, as a laterally projecting bump, and each lateral valley may be configured, for example, as a laterally recessed dimple. The crop strokers 78-1, 78-2 may be formed without lateral through-holes, although, it is to be appreciated that a laterally projecting bump or a laterally recessed dimple of the crop strokers 78-1, 78-2 could have a small through-hole.

In the illustrated embodiment, each crop stroker 78 includes a crop stroker 78-1 in the form of a lateral peak configured, for example, as a laterally projecting bump on the first lateral side 80-1 or the second lateral side 80-2 and a corresponding inversely related crop stroker 78-2 in the form of a lateral valley configured, for example, as a laterally recessed dimple on the other of the first lateral side 80-1 or the second lateral side 80-2. In other embodiments, the body 70 may be perforated such that the crop strokers 78 may be configured as holes extending laterally through the body 70.

Each array 76-1, 76-2 may include crop strokers 78-1 of the first type and crop strokers 78-2 of the second type, to enhance the roughness of the array 76-1, 76-2. The crop strokers 78-1 and the crop strokers 78-2 extend in laterally opposite directions such that the crop strokers 78-1 project laterally into the respective bay 52 and the crop strokers 78-2 are recessed laterally from the respective bay 52. Each array 76-1, 76-2 may thus include crop strokers 78-1 in the form of lateral peaks configured, for example, as laterally projecting bumps and crop strokers 78-2 in the form of valleys configured, for example, as laterally recessed dimples, with the laterally projecting bumps and the laterally recessed dimples extending in laterally opposite directions.

With respect to each array 76-1, 76-2, the rows of crop strokers include alternating rows of oppositely sensed crop strokers 78-1, 78-2, and the columns of crop strokers comprise alternating columns of oppositely sensed crop strokers 78-1, 78-2. The crop strokers of the rows and the crop strokers of the columns include crop strokers 78-1 in the form of peaks configured, for example, as laterally-projecting bumps and crop strokers 78-2 in the form of valleys configured, for example, as laterally recessed dimples. The row pattern alternates between a row of crop strokers 78-1 and a row of crop strokers 78-2. For example, with respect to array 76-1, row R1 has crop strokers 78-2, row R2 has crop strokers 78-1, row R3 has crop strokers 78-2, and row R4 has crop strokers 78-1. Similarly, the column pattern alternates between a column of crop strokers 78-1 and a column of crop strokers 78-2. For example, with respect to array 76-1, column C1 has crop strokers 78-2, column C2 has crop strokers 78-1, column C3 has crop strokers 78-2, and column C4 has crop strokers 78-1. Such pattern of alternating rows of oppositely sensed crop strokers and alternating columns of oppositely sensed crop strokers enhance the surface area roughness of the upper zone 88-1 of each array 76-1, 76-2.

The crop strokers of each diagonal D alternate between the crop stroker 78-1 and the crop stroker 78-2. For example, diagonal D1 of array 76-1 includes in sequence stroker 78-2, stroker 78-1, stroker 78-2, stroker 78-1, and stroker 78-2. Such an arrangement enhances the surface area roughness of the upper zone 88-1.

The array 76 may be stamped into the body 70. In such a case, the pattern of the array 76-1 and the pattern of the array 76-2 are laterally inversely related to one another, such that the crop strokers of the first array 76-1 and the crop strokers of the second array 76-2 are configured in a laterally inverse relationship to one another.

It is to be appreciated that the arrays 76-1, 76-2 may be manufactured by any suitable method and not necessarily by a stamping operation (e.g., molding, casting, forming, forging, bending, machining, additive process, from two separate pieces of sheet metal or other parts joined together, to name but a few other methods). In such a case, the first array 76-1 and the second array 76-2 may be configured in a manner distinct from one another such that they are not necessarily inversely related, in which case their patterns may be the same or different. For example, in some embodiments, it may be that the crop divider 50 has a single array of crop strokers on only one lateral side and not the other lateral side. It is to be appreciated that one or both arrays 76-1, 76-2 may have crop strokers of a single type or more than two types.

In some embodiments, the crop divider 50 may include an attachment (not shown) coupled to the panel 58. The attachment may include one or both of the arrays 76-1, 76-2. The attachment may be configured, for example, as an over-the-top cover on the panel 58. The attachment may be coupled to the panel 58 in a wide variety of ways (e.g., riveted, pinned, or bolted). The attachment may be made from a wide variety of materials (e.g., ultra-high molecular weight polyethylene).

Figure 10:
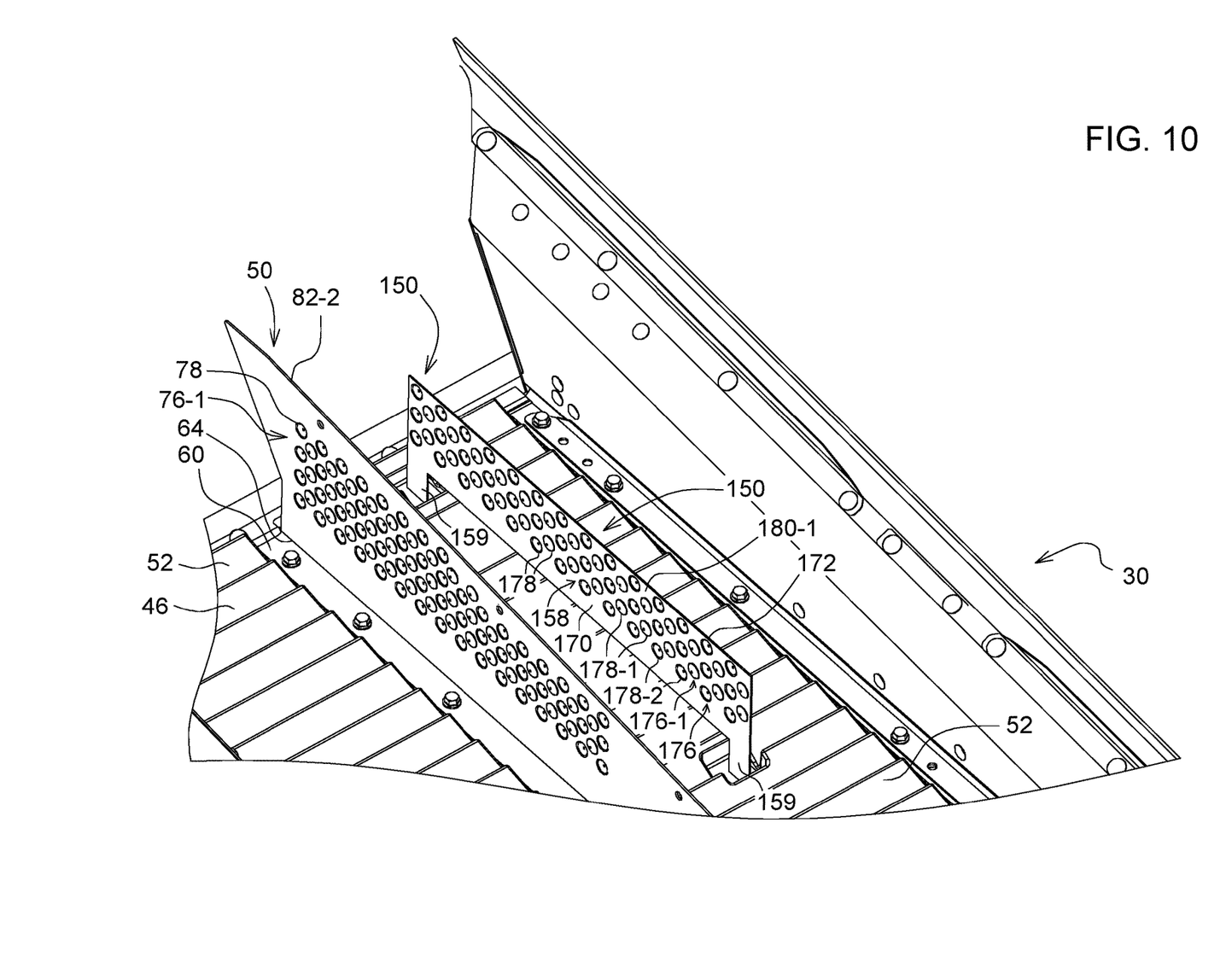
FIG. 10 is a perspective view showing an intermediate crop divider with an array of crop strokers.

An intermediate crop divider 150 may be mounted with the 30 for fore-aft reciprocating movement therewith. The crop divider 150 may be positioned, for example, between a pair of crop dividers 50, or between a crop divider 50 and a side edge of the pan 30. The crop divider 150 extends in a fore-aft manner and above the stepped floor 46 to partition crop material laterally.

The crop divider 150 includes a panel 158 and a pair of legs 159 mounted to the stepped floor 46 and supporting the panel 158 above the stepped floor 46. The panel 158 includes a body 170 and a periphery 172 disposed about the body 170. The body 170 includes a multi-dimensional, clustered array 176 of crop strokers 178 extending laterally to engage crop material to advance the crop material in the crop-processing direction 48 during fore-aft reciprocating movement of the pan 30. The crop divider 150 is shorter in length than the crop dividers, and positioned closer to the rear of the pan 30 than the front.

The array 176 includes a first array 176-1 on a first lateral side 180-1 of the body 170 and a second array (not shown) on an opposite second lateral side (not shown) of the body 170. The first and second arrays are inversely related to one another.

The crop strokers 178 are similar in structure and function as the crop strokers 78. Each crop stroker 178 includes a crop stroker 178-1 and a crop stroker 178-2 laterally inverse to the crop stroker 178-1. The crop stroker 178-1 is configured, for example, as a laterally projecting bump, and the crop stroker 178-2 is configured, for example, as a corresponding laterally recessed dimple. In other embodiments, the body 170 may be perforated such that the crop strokers 178 may be configured as holes extending laterally through the body 170.

In the array 176 and each array 176-1, 176-2, the crop strokers 178 are arranged multi-dimensionally. For example, the crop strokers 178 are arranged in rows and columns. The rows alternate between rows of crop strokers 178-1 and rows of crop strokers 178-2. Similarly, the columns alternate between columns of crop strokers 178-1 and columns of crop strokers 180-2. As such, each diagonal sequentially alternates between crop strokers 178-1 and crop strokers 178-2.

Rows and columns are staggered. For example, immediately adjacent rows are staggered relative to one another, and immediately adjacent columns are staggered relative to one another.

In some embodiments, the crop divider 150 may include an attachment (not shown) coupled to the panel 158. The attachment may include one or both of the arrays 176-1, 176-2. The attachment may be configured, for example, as an over-the-top cover on the panel 158. The attachment may be coupled to the panel 158 in a wide variety of ways (e.g., riveted, pinned, or bolted). The attachment may be made from a wide variety of materials (e.g., ultra-high molecular weight polyethylene).

In some embodiments, the crop divider 50 and/or the intermediate crop divider 150 may be applied to the return pan 40.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A cleaning system for an agricultural combine harvester, the cleaning system comprising:
   a pan comprising a stepped floor to receive crop material thereon, the pan arranged for fore-aft reciprocating movement to advance the crop material in a crop-processing direction, and
   a crop divider mounted with the pan for fore-aft reciprocating movement therewith, the crop divider extending in a fore-aft manner and above the stepped floor to partition the crop material laterally, the crop divider comprising a body and a periphery disposed about the body, the body comprising a multi-dimensional, clustered array of crop strokers extending laterally to engage the crop material to advance the crop material in the crop-processing direction during fore-aft reciprocating movement of the pan.

2. The cleaning system of claim 1, wherein the array of crop strokers comprises crop strokers of a first type and crop strokers of a second type.

3. The cleaning system of claim 2, wherein the first type is a lateral peak, and the second type is a lateral valley.

4. The cleaning system of claim 2, wherein the first type comprises laterally projecting bumps, and the second type comprises laterally recessed dimples.

5. The cleaning system of claim 1, wherein the array comprises rows of crop strokers and columns of crop strokers.

6. The cleaning system of claim 5, wherein the crop strokers of each row are positioned at regular intervals, and the crop strokers of each column are positioned at regular intervals.

7. The cleaning system of claim 5, wherein the rows of crop strokers comprise alternating rows of oppositely sensed crop strokers, and the columns of crop strokers comprise alternating columns of oppositely sensed crop strokers.

8. The cleaning system of claim 7, wherein the alternating rows are alternatingly staggered relative to one another, and the alternating columns are alternatingly staggered relative to one another.

9. The cleaning system of claim 5, wherein the rows are alternatingly staggered relative to one another, and the columns are alternatingly staggered relative to one another.

10. The cleaning system of claim 9, wherein the crop strokers of the rows and the crop strokers of the columns comprise laterally-projecting bumps and laterally recessed dimples.

11. The cleaning system of claim 1, wherein the body comprises a first lateral side and an opposite second lateral side, and each crop stroker provides a laterally projecting bump on the first lateral side or the second lateral side and an inversely related laterally recessed dimple on the other of the first lateral side or the second lateral side.

12. The cleaning system of claim 1, wherein the crop divider partitions the pan into a first bay and a second bay, the body comprises a first lateral side and an opposite second lateral side, the array is positioned on the first lateral side and extends laterally to engage crop material in the first bay, the body comprises a multi-dimensional, clustered second array of crop strokers positioned on the second lateral side and extends laterally to engage crop material in the second bay, and each of the array and the second array comprises rows and columns of laterally projecting bumps and laterally recessed dimples.

13. The cleaning system of claim 1, wherein the array of crop strokers comprises laterally projecting bumps.

14. The cleaning system of claim 1, wherein each crop stroker of the array of crop strokers has a maximum size, and immediately adjacent crop strokers are spaced apart from one another by an offset less than the maximum size.

15. The cleaning system of claim 1, wherein the crop divider has an X dimension parallel to the stepped floor and a Y dimension orthogonal to the stepped floor, the stepped floor has a step height in the Y dimension, the body of the crop divider comprises an upper zone with the array of crop strokers and a lower zone defined in the X dimension by a length of the array of crop strokers and in the Y dimension by at least a distance between the stepped floor and the array, and the distance is greater than or equal to a value of the step height.

16. The cleaning system of claim 1, wherein the crop divider comprises an upstream half and a downstream half downstream of the upstream half in the crop-processing direction, and the downstream half comprises the array of crop strokers.

17. The cleaning system of claim 1, wherein the crop divider has a Y dimension orthogonal to the stepped floor, and the array of crop strokers increases in height in the Y dimension from the stepped floor as the array extends in the crop-processing direction.

* * * * *